Patented Sept. 3, 1935

2,013,082

UNITED STATES PATENT OFFICE 2,013,082

DEODORIZATION OF LACTATES

Charles A. Vana, Cleveland, Ohio, assignor to The Grasselli Chemical Company, Cleveland, Ohio, a corporation of Delaware No Drawing. Application November 17, 1933, Serial No. 698,541

8 Claims. (Cl. 260—122)

The present invention relates to processes of treating lactates with ozone whereby certain empyreumatic impurities are destroyed or removed producing thereby lactates of better odor and color.

It has been shown by I. L. Haag in an application Ser. No. 665,976, filed Apr. 13, 1933, for Purification of lactic acid that oxidation agents generally and peroxide compounds in particular can successfully be used to destroy colored impurities contained in technical lactic acid and to otherwise purify such lactic acid to render it practically chemically pure. I have in the practice of said invention encountered technical lactic acids which contained an impurity which was not completely removed by a treatment with hydrogen peroxide or other oxidation agents as disclosed in said application, and though such treatments were entirely successful in other respects the purified products had still a faint empyreumatic odor, resembling that of burnt sugar. I have no experimental evidence upon which to base an opinion as to the chemical nature of said impurities or their origin. They may be due to by-products formed during fermentation or may be due to decomposition of lactic acid itself, or its anhydrid and can therefor be present in fermentation lactic acid, synthetic acid or an acid of any origin. For a lack of a better understanding of the nature of these impurities, I call such products of an empyreumatic nature designating thereby their main characteristics without in any way intimating that they result from a destructive thermic reaction of organic materials.

These empyreumatic impurities are very persistent and resistant to chemical and physical changes. When a lactic acid containing such impurities is transformed into its salts, esters, ethers, anhydrid, or other derivatives, it will be found that the resulting products still contain these impurities as evidenced by a faint but distinct odor and I found that the treatment of such salts, esters, anhydrid or derivatives with ozone according to my invention removes this odor the same as it does with lactic acid. I wish it to be understood that for purposes of the present invention the term "lactate" as used herein is meant to embrace lactic acid itself, its salts, esters, ethers, anhydrid, and other derivatives in which the radical of lactic acid

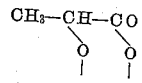

persists, such nomenclature appearing entirely logical when one considers for instance that lactic acid is hydrogen lactate and its esters may be called alkyl-lactates, etc.

In the performance of my invention I act with an ozone containing gas upon the lactate containing the empyreumatic impurity. The lactate can be in solid form but it is preferable to use it in liquid form, such as for instance in aqueous or alcoholic solution, the concentration of such solution being practically immaterial.

The ozone can be prepared in any convenient manner, for instance by passing a stream of atmospheric air or oxygen through an electrostatic field. I can obtain in this manner various concentrations of ozone entirely sufficient to act upon and remove the empyreumatic odor of lactates. While concentrations as low as 0.3%, as are easily obtained from atmospheric air, are sufficient for the purification of lactates, higher concentrations, such as of about 1% will speed up the removal of the impurities and are for this reason in some instances preferred.

The action of the ozone upon the empyreumatic impurities takes place at ordinary temperature but it is also speeded up at higher temperatures.

No reaction between the ozone and the lactate seems to occur under the conditions where the empyreumatic impurities are affected nor do I have any experimental evidence as to the nature of the products formed when the empyreumatic odor has disappeared, and I presume that if the impurities are not completely burned up by my treatment, their transformation products are present in such minute amounts that they are not detected by ordinary analytical means.

A further improvement and speeding up of the reaction between ozone and the impurities can be obtained if the ozonization is effected in the presence of activated carbon. I add, for instance, a few per cent of activated carbon to my lactate solution and bubble a stream of air which has passed through an electrostatic field through the solution. It will be found that in such a procedure the removal of the empyreumatic odor takes place in less time and with less ozone than in the absence of the activated carbon.

I am giving in the following a few examples of how I have successfully treated lactates with ozone to remove empyreumatic impurities therefrom.

1. I have bubbled a gas stream of oxygen containing 0.92% of ozone through a 29% pentahydrated calcium lactate solution of brownish color and objectionable odor. After such treatment for ½ hour at room temperature the empyreumatic odor and most of the color had disappeared from the lactate solution.

2. 85% aqueous lactic acid of slightly yellowish color and distinct empyreumatic odor was gassed for 2 hours at room temperature with an oxygen containing 0.92% ozone. The charred odor and yellowish color had completely been eliminated.

3. A considerable improvement in color and odor was noted after gassing an impure, distilled lactic acid with an air stream containing 0.3% ozone for 8½ hours. On further continued ozonization the color and odor was substantially completely removed.

4. I have passed a stream of oxygen containing 0.9% by weight of ozone through 126 pounds 85% distilled lactic acid at the rate of 0.8 liter per minute for 18 hours at room temperature and obtained a clear product without the empyreumatic odor.

The modus operandi shown in the above examples for the ozonization of calcium lactate and lactic acid is applicable to other lactates such as sodium lactate, lactic acid esters, ethers, lactic anhydrid, lactide, etc. and similar improved results in the removal of objectionable, empyreumatic color and odor are obtained.

Due to the cost of ozonization and the possibility that empyreumatic impurities are produced on distillation of lactic acid or lactates I prefer to submit to ozonization only such products which have previously been purified from such other impurities which can be removed by other chemical means, such as oxidation agents, hydrogen peroxide, etc. distillation, crystallization, solvent extraction, but my novel treatment is also applicable to such other acids where the empyreumatic odor is the main objectionable feature but other impurities of lesser objectionable nature are present.

I claim:

1. In a process of purifying lactic acid containing an empyreumatic substance as the main objectionable impurity the step of passing ozone through said lactic acid.

2. In a process of purifying technical calcium lactate containing an empyreumatic substance the step of passing ozone through an aqueous solution of said lactate.

3. In a process of purifying lactic acid containing empyreumatic impurities the step of passing ozonized oxygen through 85% lactic acid until the empyreumatic odor in the lactic acid has substantially disappeared.

4. In a process of purifying lactic acid containing empyreumatic impurities the steps of suspending activated carbon in said lactic acid and gassing it with ozone.

5. In a process of purifying a compound selected from the group of compounds consisting of lactic acid, its salts, esters, ethers and anhydrids, said compound containing as an impurity an empyreumatic substance, the step of contacting said compound with ozone.

6. In a process of purifying a compound selected from the group of compounds consisting of lactic acid, its salts, esters, ethers and anhydrids, said compound containing as an impurity an empyreumatic substance, the step of passing a gas stream containing ozone through a solution of said compound.

7. In a process of purifying a compound selected from the group of compounds consisting of lactic acid, its salts, esters, ethers and anhydrids, said compound containing as an impurity an empyreumatic substance, the step of passing a gas stream containing ozone through a solution of said compound in which activated carbon is suspended.

8. In a process of purifying a lactic acid which contains an empyreumatic substance, the step of contacting said lactic acid with ozone.

CHARLES A. VANA.